United States Patent
Achten et al.

(10) Patent No.: US 11,213,999 B2
(45) Date of Patent: Jan. 4, 2022

(54) METHOD FOR APPLYING A MATERIAL CONTAINING A MELTABLE POLYMER WITH BLOCKED NCO GROUPS

(71) Applicant: Covestro Intellectual Property GmbH & Co. KG, Leverkusen (DE)

(72) Inventors: Dirk Achten, Leverkusen (DE); Thomas Buesgen, Leverkusen (DE); Joerg Tillack, Solingen (DE); Fabian Schuster, Leverkusen (DE); Nicolas Degiorgio, Krefeld (DE); Jonas Kuenzel, Leverkusen (DE); Joerg Buechner, Bergisch Gladbach (DE); Wolfgang Arndt, Dormagen (DE); Martin Melchiors, Leichlingen (DE); Harald Kraus, Leverkusen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 17/258,201

(22) PCT Filed: Jul. 12, 2019

(86) PCT No.: PCT/EP2019/068779
§ 371 (c)(1),
(2) Date: Jan. 6, 2021

(87) PCT Pub. No.: WO2020/016115
PCT Pub. Date: Jan. 23, 2020

(65) Prior Publication Data
US 2021/0252778 A1 Aug. 19, 2021

(30) Foreign Application Priority Data
Jul. 16, 2018 (EP) .................. EP18183688

(51) Int. Cl.
| | | |
|---|---|---|
| B29C 64/118 | (2017.01) | |
| B33Y 10/00 | (2015.01) | |
| B33Y 40/00 | (2020.01) | |
| B33Y 70/00 | (2020.01) | |
| B33Y 80/00 | (2015.01) | |
| B29C 64/30 | (2017.01) | |
| C08G 18/48 | (2006.01) | |
| C08G 18/73 | (2006.01) | |
| C08G 18/75 | (2006.01) | |
| B29K 75/00 | (2006.01) | |

(52) U.S. Cl.
CPC ............ *B29C 64/118* (2017.08); *B29C 64/30* (2017.08); *B33Y 10/00* (2014.12); *B33Y 40/00* (2014.12); *B33Y 70/00* (2014.12); *B33Y 80/00* (2014.12); *C08G 18/4808* (2013.01); *C08G 18/73* (2013.01); *C08G 18/755* (2013.01); *B29K 2075/00* (2013.01); *B29K 2995/007* (2013.01)

(58) Field of Classification Search
None
See application file for complete search history.

(56) References Cited

U.S. PATENT DOCUMENTS

| | | | |
|---|---|---|---|
| 4,946,535 A | 8/1990 | Meckel et al. | |
| 5,121,329 A | 6/1992 | Crump | |
| 7,005,482 B2 | 2/2006 | Guse et al. | |
| 10,052,682 B2 | 8/2018 | Ederer et al. | |
| 2003/0026999 A1 | 2/2003 | Schelhaas et al. | |
| 2012/0184166 A1* | 7/2012 | Kurihara ............... D01F 6/82 442/181 |
| 2017/0129177 A1 | 5/2017 | Hattig et al. | |
| 2018/0094171 A1 | 4/2018 | Briers et al. | |
| 2018/0122570 A1 | 5/2018 | Li et al. | |

FOREIGN PATENT DOCUMENTS

| | | |
|---|---|---|
| EP | 1036103 B1 | 9/2002 |
| WO | WO 2016061060 A1 | 4/2016 |
| WO | WO 2018046726 A1 | 3/2018 |

OTHER PUBLICATIONS

International Search Report, PCT/EP2019/068//9, dated Aug. 1, 2019, Authorized officer: Michael Hoffmann.

* cited by examiner

*Primary Examiner* — Jeffrey D Washville
(74) *Attorney, Agent, or Firm* — Jed C. Benson

(57) ABSTRACT

A method of applying a material comprising a fusible polymer comprises the step of:
applying a filament of the at least partly molten material comprising a fusible polymer from a discharge opening of a discharge element to a first substrate.
The fusible polymer has the following properties:
a melting point (DSC, differential scanning calorimetry; 2nd heating at heating rate 5° C./min) within a range from ≥35° C. to ≤150° C.;
a glass transition temperature (DMA, dynamic-mechanical analysis to DIN EN ISO 6721-1:2011) within a range from ≥−70° C. to ≤110° C.;
wherein the filament, during the application process, has an application temperature of ≥100° C. above the melting point of the fusible polymer for ≤20 minutes.
There are furthermore blocked NCO groups present in the material comprising the fusible polymer.

14 Claims, No Drawings

METHOD FOR APPLYING A MATERIAL CONTAINING A MELTABLE POLYMER WITH BLOCKED NCO GROUPS

CROSS-REFERENCE TO RELATED APPLICATION

This application is a national stage application under 35 U.S.C. § 371 of PCT/EP2019/068799, filed Jul. 12, 2019, which claims the benefit of European Application No. 18183688.3, filed Jul. 16, 2018, each of which is incorporated herein by reference.

FIELD

The present invention relates to a method of applying a material comprising a fusible polymer, comprising the step of applying a filament of the at least partly molten material comprising a fusible polymer from a discharge opening of a discharge element to a first substrate.

BACKGROUND

Additive manufacturing methods refer to those methods by which articles are built up layer by layer. They therefore differ markedly from other processes for producing articles such as milling or drilling. In the latter methods, an article is processed such that it takes on its final geometry via removal of material.

Additive manufacturing methods use different materials and processing techniques to build up articles layer by layer. In fused deposition modeling (FDM) methods, for example, a thermoplastic wire is liquefied and deposited onto a movable construction platform layer by layer with the aid of a nozzle. Solidification gives rise to a solid article. The nozzle and construction platform are controlled on the basis of a CAD drawing of the article. An early patent document for this technology is U.S. Pat. No. 5,121,329. If the geometry of this article is complex, for example with geometric undercuts, support materials additionally have to be printed and removed again after completion of the article.

The thermoplastic polyurethane according to WO 2015/197515 A1 has a melting range (DSC, differential scanning calorimetry; second heating operation at heating rate 5 K/min) of 20 to 170° C. and a Shore A hardness to DIN ISO 7619-1 of 50 to 95, has a melt volume rate (MVR) at a temperature T to ISO 1133 of 5 to 15 cm$^3$/10 min and a change in MVR in the case of an increase in this temperature T by 20° C. of less than 90 cm$^3$/10 min. The end use is the production of articles in powder-based additive manufacturing methods.

WO 2016/198425 A1 discloses a thermally conductive hotmelt adhesive composition comprising a) at least one thermally conductive filler, wherein the thermally conductive filler comprises a mixture of flake particles and first spherical particles in a ratio of 10:1, and wherein the flake particles have an aspect ratio of 1.27:7. Alternatively, the thermally conductive filler contains a mixture of second spherical particles having an average particle size of 35 to 55 µm and third spherical particles having an average particle size of 2 to 15 µm in a ratio of 10:1. The thermally conductive filler is selected from the group consisting of tin oxide, indium oxide, antimony oxide, aluminium oxide, titanium oxide, iron oxide, magnesium oxide, zinc oxide, oxides of rare earth metals, alkali metal and alkaline earth metal sulfates, chalk, boron nitride, alkali metal silicate, silica, iron, copper, aluminium, zinc, gold, silver, tin, alkali metal and alkaline earth metal halides, alkali metal and alkaline earth metal phosphates, and mixtures thereof. In addition, the composition b) comprises at least one (co) polymer selected from polyamide, thermoplastic polyamides, copolyamides, butyl rubber, polybutene, poly(meth) acrylates, polystyrene, polyurethanes, thermoplastic polyurethane, polyesters, ethylene copolymers, ethylene-vinyl copolymers, SB rubber, SEBS rubber, SI rubber, SIS rubber, SBS rubber, SIB rubber, SIBS rubber, polylactide, silicones, epoxies, polyols and mixtures thereof. According to a use claim, the material is also to be usable as filament for 3D printing.

DE 10 2012 020000 A1 relates to a multistage 3D printing method and to a device usable for this method. This patent application states that, after the process step referred to as unpacking, the shaped articles are sent to the final consolidation step. Subsequently, the shaped articles are sent to further subsequent processes. This process step is preferably executed as a heat treatment step. Parts made of Croning sand that have been produced by the process can serve as an example here. After unpacking, these are preferably embedded again into a further particulate material. However, this does not have any binder coating and preferably has good thermal conductivity. Thereafter, the parts are heat-treated in an oven above the melting temperature of the binder. The specific phenolic resin of the coating in one of the preferred embodiments is crosslinked and there is a significant rise in strength. In general, hotmelt adhesives are preferred for this process step of final consolidation. Base polymers used may preferably be: PA (polyamides), PE (polyethylene), APAO (amorphous polyalphaolefins), EVAC (ethylene-vinyl acetate copolymers), TPE-E (polyester elastomers), TPE-U (polyurethane elastomers), TPE-A (copolyamide elastomers) and vinylpyrrolidone/vinyl acetate copolymers. Further customary additions known to those skilled in the art, such as nucleating agents, may be added.

Reactive hotmelt adhesives have already been described in the prior art. EP 1 036 103 B1 relates, for example, to a solvent-free moisture-curing polyurethane hotmelt adhesive composition which is solid at room temperature and comprises the product of the combination of the following constituents:

a) 95-3% by weight of the reaction product of a first polyisocyanate and a polymer of ethylenically unsaturated monomers having a molecular weight below 60 000, wherein said polymer has active hydrogen groups; and not a copolymer of ethylene, vinyl acetate and an ethylenically unsaturated monomer having at least one primary hydroxyl group;

b) 5-90% by weight of at least one polyurethane prepolymer with free isocyanate groups prepared from at least one polyol from the group of the polyester diols, polyester triols, polyester polyols, aromatic polyols and mixtures thereof and at least one second polyisocyanate which may be the same as or different from the first polyisocyanate; and c) 0-40% by weight of at least one additive from the group of the catalysts, tackifiers, plasticizers, fillers, pigments, stabilizers, adhesion promoters, rheology improvers and mixtures thereof, wherein the sum of a), b) and c) is 100% by weight.

EP 1 231 232 B1 discloses a self-supporting reactive hotmelt adhesive element comprising a reactive one-component hotmelt adhesive which is solid at room temperature and comprises at least one isocyanate which is solid or liquid at room temperature and at least one isocyanate-reactive polymer and/or resin which is solid at room temperature. In one embodiment, the isocyanate used is a masked or blocked isocyanate which especially eliminates the blocking or masking groups under the action of heat and/or moisture. The process described in EP 1 232 232 B1 does not describe use at temperatures >160° C. The examples are essentially undistilled isocyanate-functional low molecular weight prepolymers having an excess of monomeric or dimeric isocyanates. Owing to the production method with a distinct excess of isocyanate functionality, no linear high molecular weight polymers are formed.

WO 2018/046726 A1 relates to a method of producing an article, comprising the steps of:

I) applying a filament of an at least partly molten construction material to a carrier, such that a layer of the construction material is obtained, corresponding to a first selected cross section of the article;

II) applying a filament of the at least partly molten construction material to a previously applied layer of the construction material, such that a further layer of the construction material is obtained, which corresponds to a further selected cross section of the article and which is bonded to the layer applied beforehand;

III) repeating step II) until the article is formed;

where at least steps II) and III) are conducted within a chamber and the construction material includes a fusible polymer. The fusible polymer has a melting range (DSC, differential scanning calorimetry; 2nd heating at heating rate 5 K/min) of >20° C. to ≤100° C. and a magnitude of the complex viscosity 10 (determined by viscometry measurement in the melt with a plate/plate oscillation shear viscometer at 100° C. and a shear rate of 1/s) of >10 Pas to ≤1 000 000 Pas and the temperature within the chamber is <50° C.

SUMMARY

The problem addressed by the present invention is that of at least partly remedying the disadvantages in the prior art. A particular problem addressed is that of specifying a novel processing method for (latently) reactive hotmelt adhesives.

This problem is solved by a method according to claim 1. Advantageous developments are specified in the subsidiary claims. They may be combined as desired, unless the opposite is apparent from the context.

DETAILED DESCRIPTION

What is proposed in accordance with the invention is a method of applying a material comprising a fusible polymer, comprising the step of:

applying a filament of the at least partly molten material comprising a fusible polymer from a discharge opening of a discharge element to a first substrate;

wherein the fusible polymer has the following properties:

a melting point (DSC, differential scanning calorimetry; 2nd heating at heating rate 5° C./min) within a range from ≥35° C. to ≤150° C. (preferably ≥40° C. to ≤130° C., more preferably ≥45° C. to ≤120° C.);

a glass transition temperature (DMA, dynamic-mechanical analysis to DIN EN ISO 6721-1:2011) within a range from ≥−70° C. to ≤110° C. (preferably ≥−50° C. to ≤50° C., more preferably ≥−45° C. to ≤20° C.);

wherein the filament, during the application process, has an application temperature of ≥100° C. (preferably ≥120° C., more preferably ≥180° C. and very preferably ≥200° C.) above the melting point of the fusible polymer for ≤20 minutes (preferably ≥1 second to ≤10 minutes, more preferably ≥1 second to ≤5 minutes, further preferably ≥1 second to ≤2 minutes, especially preferably ≥1 second to ≤30 seconds) and wherein there are furthermore NCO groups blocked with a blocking agent present in the material comprising the fusible polymer.

The first substrate to which the filament is applied may be a flat or curved surface or else the last layer applied within a 3D printing method.

The fusible polymer, which is generally a semicrystalline polymer, without wishing to impose any restriction, can be described as a hotmelt adhesive. It has been found that, surprisingly, such hotmelts can be processed briefly at temperatures well above their melting temperature and even their decomposition temperature without occurrence of significant losses in their desired properties. The breakdown temperature is understood here to mean a temperature at which a polymeric material, within a period of ≤1 hour, more than doubles its storage modulus G' (DNA, dynamic-mechanical analysis to DIN EN ISO 6721-1:2011 at a frequency of 1/s), or else the storage modulus G' falls to a value of less than half the starting value.

The discharge opening of a discharge element is preferably a nozzle.

Particularly suitable devices for the applying of the material comprising a fusible polymer have been found to be printheads that work by the principle of an FDM 3D printer. This typically involves conveying a pre-extruded strand of a thermoplastic material (solid filament) through a short heating zone in order to be extruded at the end of the heating zone through a nozzle with a smaller cross-sectional area than the cross-sectional area of the solid filament conveyed. During the extrusion, the printhead can be moved freely in space in XYZ direction, but is typically at a constant distance above a substrate surface, the distance from the substrate surface usually being smaller than the average nozzle diameter, such that the extrudate is deformed under pressure on deposition onto the substrate. The movement speed of the printhead is typically greater than the extrusion speed of the extrudate from the nozzle, as a result of which it undergoes additional tensile deformation. In FDM methods for production of additively manufactured components, movement speeds of 20-50 mm/s are typically chosen. Better results are typically achieved with low movement speeds.

In the method according to the invention, by contrast, it is advantageous to establish movement speeds (application speeds) of more than 20 mm/s, preferably >50 mm/s and most preferably >100 mm/s. The application layer thickness and the application layer width are controllable via the ratio of discharge rate of the material from a discharge nozzle, nozzle geometry, material pressure, movement speed of the nozzle and distance of the nozzle from the substrate surface. If the discharge rate from the nozzle is lower than the movement speed and the nozzle distance from the substrate is lower than the nozzle diameter, the result is coatings with an application layer thickness lower than the nozzle diameter. When the nozzle distance from the substrate is greater than the nozzle diameter and the movement speed is not equal to the discharge rate, there is no continuous and uniform layer deposition, and therefore this embodiment is not preferred.

If the viscosity of the hotmelt at the nozzle exit is too high, the discharge rate is limited by the pressure buildup in the printhead and the maximum conveying output. Moreover, a high pressure at the nozzle head, owing to a high hotmelt viscosity, typically causes distinct die swell up to and including periodically pulsating die swell at the nozzle exit.

The maximum movement speed at which there is continuous layer deposition with a layer thickness diameter less than the nozzle diameter is therefore a good guide value for a stable process state. The movement rate is still the preferred adjustment parameter for an FDM printer from which the desired discharge rate is calculated in the printing program at a given layer distance and nozzle geometry, and the material conveying rate is established correspondingly.

Using the movement speed of a printhead with a 0.4 mm round nozzle and assuming a substrate distance of 0.2 mm, it is also possible to calculate the residence time in the heated part of the printhead with a volume of, for example, about 200 mm$^3$.

The method of the invention is particularly suitable for the processing of high molecular weight hotmelt adhesives that have a molecular weight $M_w$ by GPC in DMF/LiBr (1%) against polystyrene standards and after universal calibration by means of a viscosity detector of >30 000, preferably >50 000, more preferably >80 000, most preferably >100 000 g/mol, and/or a storage modulus G' (plate/plate oscillation viscometer to ISO 6721-10 at a frequency of 1/s) at 20° C. above the melting point of $\geq 1\cdot 10^4$ Pa, preferably $\geq 5\cdot 10^4$ Pa, more preferably $\geq 1\cdot 10^5$ Pa and most preferably $\geq 5\cdot 10^5$ Pa.

Particularly suitable hotmelts for use in the method according to the invention have the further feature of slow crystallization below the melting temperature. This enables long open times of the adhesive at temperatures below the melting temperature, as opposed to conventional hotmelts that are preferably joined hot, i.e. at temperatures around the melting point. In a particularly preferred embodiment, in the method according to the invention, hotmelts having a long open time of $\geq 10$ seconds, preferably $\geq 30$ seconds, more preferably $\geq 1$ min and more preferably $\geq 5$ min at a temperature $\leq$(melting point—10° C. (preferably –20° C. and more preferably –30° C.) are used. In a further particularly preferred embodiment, these hotmelts, after rapid cooling by application to a substrate having a temperature of $\leq 30°$ C. and $\geq 10°$ C., directly after cooling to the substrate temperature, have a storage modulus G' (plate/plate oscillation viscometer to ISO 6721-10 at a frequency of 1/s) of $\geq 1\cdot 10^5$ Pa, preferably $\geq 2\cdot 10^5$ Pa, more preferably $\geq 3\cdot 10^5$ Pa and most preferably $\geq 4\cdot 10^5$ Pa and $\leq 5\cdot 10^7$ Pa, preferably $\leq 1\cdot 10^7$ Pa and more preferably $\leq 5\cdot 10^6$ Pa.

The individual extrudate filaments as formed at the nozzle exit, for example, may assume a wide variety of different shapes depending on the nozzle geometry. Preference is given to using rotationally symmetric, box-shaped or slot-shaped nozzle geometries that enable the application of coating strips with a coating thickness of $\geq 20$ μm to $\leq 5$ mm, preferably $\geq 50$ μm to $\leq 2$ mm, more preferably 80 μm to $\leq 1$ mm and most preferably 80 μm to $\leq 0.5$ mm.

At the application temperatures in the method according to the invention, the previously blocked NCO groups are deblocked, such that postcrosslinking of the applied material inter alia is possible. In this respect, the material can also be referred to as reactive or latently reactive. The co-reactants for the NCO groups may be in free form in the material, for example in the form of free hydroxyl or amino groups, or else be generated by thermal opening of functional groups obtained by addition. The term "postcrosslinking" also includes the case that the material was not crosslinked prior to the application.

It is advantageous for the method according to the invention when the distribution of the blocked isocyanate in the polymeric matrix prior to the application to a substrate is worse/coarser than after application to a substrate. This is achieved in that a blocked polyisocyanate is melted at processing temperatures of $\geq 120°$ C., preferably $\geq 150°$ C., more preferably $\geq 180°$ C. and most preferably $\geq 200°$ C. and incorporated into the polymer matrix, where the blocked isocyanate melts during the application and at least partly dissolves in the polymeric matrix or has an average particle size after application in the polymeric matrix of <50 μm (preferably <20 μm, more preferably <10 μm and most preferably <5 μm). The average particle size can be measured here by microscopy on a section image.

It is also advantageous when the blocked polyisocyanate, prior to application as latently reactive hotmelt adhesive, is already in the form of a heterogeneous mixture with the polymer matrix. The solid blocked polyisocyanate can be incorporated into the fusible polymer by various methods. A suitable method is the coprecipitation or the co-freezing-out of an aqueous blocked polyisocyanate dispersion together with an aqueous hotmelt adhesive dispersion. Another method is the joint application and drying of an aqueous hotmelt adhesive dispersion and an aqueous blocked polyisocyanate dispersion. Another suitable method is the mixing of powders of a micronized hotmelt adhesive/polymer matrix and a solid micronized blocked polyisocyanate. A further method is the cryogenic grinding of a hotmelt adhesive together with a solid blocked polyisocyanate. A further method is the mixing of a solid blocked polyisocyanate with a hotmelt adhesive in a thermoplastic mixing process by means of a co-extruder, kneader, roll or another suitable mechanical mixing method above the melting temperature of the thermoplastic.

In a preferred embodiment, the blocked isocyanate is liquid and is incorporated in liquid form by a suitable mechanical method, for example rolling, kneading, stirring, into the hotmelt adhesive at temperatures preferably below the deblocking temperature of the blocked isocyanate for a period of <8 h (preferably <6 h, more preferably <2 h and most preferably <1 h). The deblocking temperature shall be defined as the temperature at which half the blocked isocyanate is degraded within a period of 1 h in the presence of the Zerewitinoff-active hydrogen atoms present in the hotmelt adhesive.

In all these methods for production of a heterogeneous mixture of the polymeric matrix and the blocked polyisocyanate, the temperature is preferably chosen such that preliminary reaction of the blocked isocyanate with the polymeric matrix is largely prevented. "Largely prevented" in this context means that more than 70% (preferably 80% and more preferably 90%) of the blocked isocyanate is still in unreacted form in the heterogeneous mixture.

Prior to the application of the reactive hotmelt adhesive in the method according to the invention, there is thus preferably a heterogeneous mixture of at least one solid or liquid blocked isocyanate with a solid polymer. In the method according to the invention, this heterogeneous mixture, prior to application to a substrate, is correspondingly heated and preferably mixed by means of at least one shear force of $\geq 10/s$ for a period of $\geq 0.5$ sec. The distribution of the blocked isocyanate in the polymeric matrix may change here toward better distribution or a greater surface area of the interface between blocked polyisocyanate and polymeric matrix, preferably toward a homogeneous mixture with particle sizes of the polyisocyanate within the polymeric matrix of <20 μm (preferably <10 μm, more preferably <5 μm and most preferably <1 μm).

The good distribution of the blocked polyisocyanate in the polymeric matrix after application to a substrate may lead, after a period of <14 d (preferably <7 d and more preferably <3 d), to an increase in the melt viscosity of the polymeric matrix at a temperature 20° C. above the melting point thereof of at least 50% (preferably 100% and more preferably 200%).

In the method according to the invention, the possibility of reaction of the NCO groups can address two aspects of the processing of hotmelt adhesives. Firstly, thermal degradation reactions in the fusible polymer can be alleviated. Such reactions may be, for example, the cleavage of urethane or urea groups. This aspect is already manifested at relatively low contents of available NCO groups. Secondly, the parameters of "tack" and "softening point" of hotmelt adhesives are also advantageously influenced. This aspect is manifested at comparatively high contents of available NCO groups.

The postcrosslinking of the material applied can further increase the melt modulus by at least 50% and the heat resistance of a bond by at least 10° C.

The NCO groups are introduced into the material preferably on mixing of the fusible polymer with a component containing the NCO groups to give the material to be processed. The mixing is preferably conducted under shear at temperatures below the melting point of the fusible polymer.

In a preferred embodiment, the content of blocked NCO groups is within a range from ≥0.1% by weight to ≤10% by weight (titrimetric determination to DIN EN ISO 11909), based on the total weight of the material containing a fusible polymer (preferably ≥0.3% by weight to ≤7% by weight, more preferably ≥0.5% by weight to ≤5% by weight). Blocked NCO groups are deblocked beforehand for the determination of the NCO content. Examples of blocking agents are acetylacetone, 3,5-dimethylpyrazole, 2-butanone oxime, ε-caprolactam and mixtures thereof.

In a further preferred embodiment, the fusible polymer also has at least one of the following properties:

A1) a storage modulus G' (plate/plate oscillation viscometer to ISO 6721-10 at a frequency of 1/s) at 20° C. above the melting point of $\geq 1 \cdot 10^4$ Pa, preferably $\geq 5 \cdot 10^4$ Pa, more preferably $\geq 1 \cdot 10^5$ Pa; most preferably $\geq 2 \cdot 10^5$ Pa;

A2) a storage modulus G' (plate/plate oscillation viscometer to ISO 6721-10 at a frequency of 1/s) at 10° C. below the melting point with prior heating to a temperature of 20° C. above the melting point and subsequent cooling at a cooling rate of 1° C./min of $\leq 1 \cdot 10^7$ Pa, preferably $\leq 5 \cdot 10^6$ Pa, more preferably $\leq 1 \cdot 10^6$ Pa;

A3) the storage modulus G' (plate/plate oscillation viscometer to ISO 6721-10 at a frequency of 1/s) of the fusible polymer at the highest application temperature attained during the application process is a factor of ≥10 less (preferably ≥30 less, most preferably ≥100 less) than the storage modulus G' (plate/plate oscillation viscometer to ISO 6721-10 at a frequency of 1/s) at a temperature of 20° C. above the melting point of the fusible polymer, A4) at least two of properties A1) to A3).

In a further preferred embodiment, the blocked NCO groups in the material comprising the fusible polymer are present in a separate component having an average molecular weight Mn (determined by means of gel permeation chromatography against polystyrene standards and N,N-dimethylacetamide as eluent) of ≥340 g/mol to ≤10 000 g/mol (preferably ≥400 g/mol to ≤8000 g/mol and more preferably ≥500 g/mol to ≤5000 g/mol). Examples of such separate components are water-dispersible aliphatic hydrophilized polyisocyanate crosslinkers (hardeners) that are used in industry for the formulation of water-dispersible coatings. Preferred blocking agents in the separate component are 2-butanone oxime (MEKO), 3,5-dimethylpyrazole, caprolactam or a combination of at least two of these.

In a further preferred embodiment, there are furthermore free groups having Zerewitinoff-active hydrogen atoms present in the material comprising the fusible polymer. These are preferably alcohols, thiols, polyamines, urethanes and/or ureas. Together with the NCO groups, it is then possible for crosslinking reactions to proceed in the material applied. Useful examples include polyester polyols, polyether polyols, polycarbonate polyols, polyacrylate polyols, polyurethanes, polythiols, polyureas or a combination of at least two of these.

In a further preferred embodiment, the blocking agent is selected such that deblocking of the NCO group is not followed by release of the blocking agent as a free molecule or as a part of other molecules or molecular moieties. In this connection, reference is also made to elimination product-free blocking agents. This has the advantage that emissions of organic compounds caused by the blocking agent can be avoided.

In a further preferred embodiment, the blocking agent is selected from the group consisting of organic isocyanates, lactams, glycerol carbonate, a compound of general formula (I):

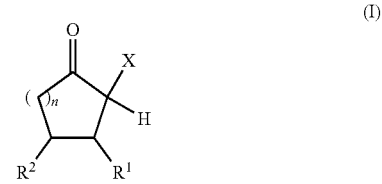

in which X is an electron-withdrawing group, $R^1$ and $R^2$ independently represent the radicals H, $C_1$-$C_{20}$-(cyclo)alkyl, $C_6$-$C_{24}$-aryl, $C_1$-$C_{20}$-(cyclo)alkyl ester or amide, $C_6$-$C_{24}$-aryl ester or amide, mixed aliphatic/aromatic radicals having 1 to 24 carbon atoms which may also be part of a 4- to 8-membered ring and n is an integer from 0 to 5 or a combination of at least two of these.

The electron-withdrawing group X may be any substituent which results in CH acidity of the α-hydrogen. These may be for example ester groups, amide groups, sulfoxide groups, sulfone groups, nitro groups, phosphonate groups, nitrile groups, isonitrile groups, polyhaloalkyl groups, halogens such as fluorine, chlorine or carbonyl groups. Nitrile and ester groups are preferred and methyl carboxylate and ethyl carboxylate groups are particularly preferred. Also suitable are compounds of general formula (I) whose ring optionally contains heteroatoms, such as oxygen, sulfur or nitrogen atoms. It is preferable when the activated cyclic ketone of formula (I) has a ring size of 5 (n=1) and 6 (n=2).

Preferred compounds of general formula (I) are cyclopentanone-2-carboxymethyl ester and -carboxyethyl ester, cyclopentanone-2-carbonitrile, cyclohexanone-2-carboxymethyl ester and -carboxyethyl ester or cyclopentanone-2-carbonylmethyl. Cyclopentanone-2-carboxymethyl ester and -carboxyethyl ester and also cyclohexanone-2-carboxymethyl ester and -carboxyethyl ester are particularly preferred. The cyclopentanone systems are industrially readily obtainable by a Dieckmann condensation of dimethyl adipate or diethyl adipate. Cyclohexanone-2-carboxymethyl ester may be produced by hydrogenation of methyl salicylate.

In the case of compounds of type (I) the blocking of the NCO groups, the deblocking and the reaction with polyols or polyamines proceed according to the following exemplary scheme:

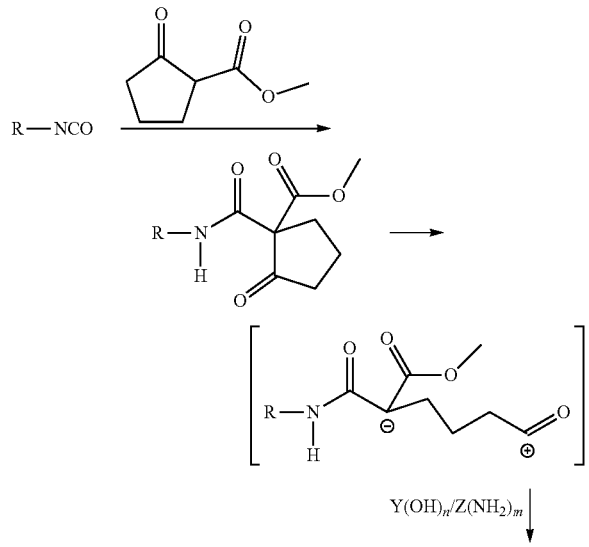

The group R represents any desired radical. The β-diketone of general formula (I) in which $R^1$ and $R^2$ represent H and X represents $C(O)OCH_3$ undergoes addition via its C—H-acidic C atom onto the free NCO-group to form a further urethane group. In this way, a molecule having a blocked NCO group is obtained. The NCO group may subsequently be deblocked again. This is achieved by opening the cyclopentanone ring, thus formally forming a carbanion and an acyl cation.

This is represented by the intermediate shown in square brackets. A polyol $Y(OH)_n$ or a polyamine $Z(NH_2)_m$ (secondary amines are of course also possible) where n≥2 and m≥2 undergo formal addition onto the acyl cation with their OH group or amino group, an H atom further migrating to the carbanion C atom. As is readily apparent, the blocking agent remains covalently bonded.

The blocking of NCO groups, deblocking thereof and the reaction of the functional groups obtained after the deblocking with polyols or polyamines based on glycerol carbonate is shown by way of example in the following scheme:

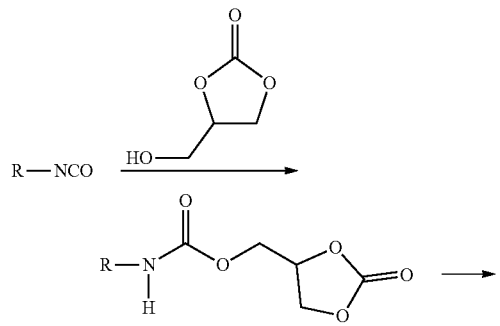

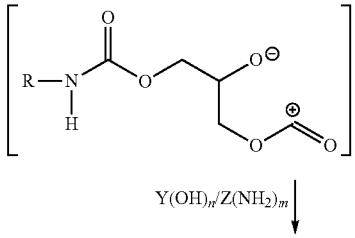

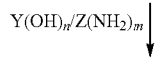

The group R represents any desired radical. The glycerol carbonate undergoes addition via its free OH group onto the free NCO group to form a further urethane group. The NCO group may subsequently be deblocked again. This is achieved by opening the cyclic carbonate ring, thus formally forming an alkoxide ion and an acyl cation. This is represented by the intermediate shown in square brackets. An alcohol $Y(OH)_n$ or an amine $Z(NH_2)_m$ (secondary amines are of course also possible) where n≥2 and m≥2 undergo formal addition onto the acyl cation with their OH group or amino group, a proton further migrating to the carbanion C atom. As is readily apparent, the blocking agent remains covalently bonded.

In the case of lactams ε-caprolactam is preferred. The blocking and deblocking proceeds analogously to the two schemes shown hereinabove. The N—H group of the lactam undergoes addition onto the free NCO group to form a urea group. Opening of the lactam ring again formally gives rise to an acyl cation and a negatively charged N atom. Alcohols or amines may undergo addition onto the acyl cation and transfer the surplus proton to the negatively charged N atom. Here too, the blocking agent remains covalently bonded.

Preference is given to the case where the blocking agent is an organic isocyanate. The NCO group to be blocked can then react with the NCO group of the blocking agent to form a uretdione. The reverse reaction results in reformation of the NCO groups which react with the available chain extenders. It is particularly preferable when the blocking agent and the compound having the NCO group to be blocked are identical. Blocking then comprises a dimerization of the relevant compound. This and the reaction with polyol and polyamine are shown by way of example in the scheme which follows.

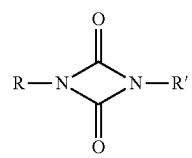

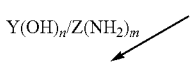
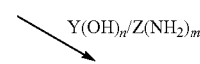

The groups R and R' represent any desired radicals. Deblocking results in opening of the uretdione ring to reform two NCO groups. These may then be reacted with alcohols or amines Alcohols $Y(OH)_n$ or amines $Z(NH_2)_m$ (secondary amines are of course also possible) where n≥2 and m≥2 undergo addition onto the NCO groups to form urethane or urea groups.

In a further preferred embodiment, the blocking agent is selected from acetylacetone, acetoacetic acid, malonic esters, substituted or unsubstituted pyrazoles (preferably 3,5-dimethylpyrazole), alkanone oximes (preferably 2-butanone oxime, MEKO), secondary amines (preferably N-tert-butyl-N-benzylamine, BEBA) or a combination of at least two of these.

In a preferred embodiment, the blocked isocyanate is deblocked during the application and bonding process in the presence of (standard literature-disclosed) catalysts or inhibitors that accelerate or retard deblocking.

Suitable catalysts are, inter alia, nucleophilic or electrophilic by nature and are particularly suitable as (trans) urethanization catalysts and allophanatization catalysts. A typical representative is, for example, $Sn(octoate)_2$ or dibutyltin dilaurate (DBTL). The catalysts and inhibitors are specifically selected for the respective blocked isocyanate.

In a further preferred embodiment, the temperature of the extrudate at the nozzle head is ≥120° C., preferably ≥150° C. and more preferably ≥200° C. and most preferably ≥250° C.

The material is preferably dried before use in the method according to the invention and has a water content of ≤3% by weight (preferably ≤1% by weight, more preferably ≤0.5% by weight and most preferably ≤0.1% by weight).

In a further preferred embodiment, the material in the method according to the invention experiences a heat integral, defined as the area of the temperature residence time above the melting temperature of crosslinkable material after feeding into the extruder and prior to application to the substrate, of ≤2000° C.·min, preferably ≤500° C.·min, preferably ≤300° C.·min and most preferably ≤100° C.·min and ≥2° C.·min, preferably ≥5° C.·min and more preferably ≥10° C.·min. The heat integral is calculated by way of example for a residence time of 5 min at 200° C. as 200° C.·5 min=1000° C.·min.

In a further preferred embodiment, on application of the material to the substrate by the method according to the invention, a pressure on the substrate of ≥0.1 bar, preferably ≥0.5 bar, more preferably ≥0.8 bar and most preferably ≥1 bar, and ≤50 bar, preferably ≤20 bar, more preferably ≤10 bar, is built up. The pressure under consideration here is the sum total of the pressure that arises as a result of the conveying of the hotmelt and the pressure that the discharge opening together with the discharge element exerts on the substrate, for example by spring load or pneumatic or hydraulic backpressure.

As well as the fusible polymer, the material may comprise further additives such as fillers, pigments, adhesion improvers, levelling auxiliaries, defoamers, oxidation and hydrolysis stabilizers and the like, but also further polymers. The total content of additives in the material may, for example, be ≥0.5% by weight to ≤20% by weight.

The fusible polymer may, after heating to a temperature of 20° C. above the melting point and cooling to 20° C. at a cooling rate of 4° C./min, within a temperature interval from 25° C. to 40° C. for ≥1 minute (preferably ≥1 minute to ≤100 minutes, more preferably ≥3 minutes to ≤80 minutes, even more preferably ≥5 minutes to ≤60 minutes), have a storage modulus G' (determined at the respective temperature with a plate/plate oscillation viscometer according to ISO 6721-10 at a frequency of 1/s) of ≥1·10⁵ Pa, preferably ≥2·10⁵ Pa, more preferably ≥3·10⁵ Pa and most preferably ≥4·10⁵ Pa to ≤10 MPa, preferably ≤5 MPa and more preferably ≤1 MPa and, after cooling to 20° C. and storage at 20° C. for 120 minutes, have a storage modulus G' (determined at 20° C. with a plate/plate oscillation viscometer according to ISO 6721-10 at a frequency of 1/s) of ≥20 MPa (preferably ≥50, more preferably ≥100 MPa).

The fusible polymer may also have a magnitude of the complex viscosity |η*| (determined by viscometry measurement in the melt with a plate/plate oscillation viscometer according to ISO 6721-10 at 20° C. above the melting temperature and a frequency of 1/s) of ≥100 Pas to ≤5 000 000 Pas. Preferably, |η*| under these measurement conditions is ≥500 Pas to ≤1 000 000 Pas, more preferably ≥1000 Pas to ≤500 000 Pas.

The magnitude of the complex viscosity |η*| describes the ratio of the viscoelastic moduli G' (storage modulus) and G" (loss modulus) to the excitation frequency co in a dynamic-mechanical material analysis:

$$|\eta^*| = \sqrt{\left[\left(\frac{G'}{\omega}\right)^2 + \left(\frac{G''}{\omega}\right)^2\right]} = \frac{|G^*|}{\omega}$$

Given the complex viscosities within the range specified in accordance with the invention, it can be assumed that, in the case of prolonged storage at room temperature, only a technically insignificant level of tackiness, if any, will occur in the fusible polymer used.

In a further preferred embodiment, the filament is applied at a rate of ≥20 mm/s. This is understood to mean the relative speed of discharge opening and substrate. The application rate is preferably ≥50 mm/s, more preferably ≥100 mm/s.

In a further preferred embodiment, the fusible polymer has a melt viscosity (plate/plate oscillation viscometer to ISO 6271-10 at a frequency of 1/s) at a temperature of 20° C. above the melting point $T_m$ of ≥1000 Pas to ≤500 000 Pas.

In a further preferred embodiment, the fusible polymer is selected such that, after storage at the maximum application temperature attained for a duration of ≤1 hour (preferably ≤30 minutes, more preferably ≤5 minutes, especially preferably ≤1 minute, most preferably ≤10 seconds), the storage modulus G' (DMA, dynamic-mechanical analysis to DIN EN ISO 6721-1:2011 at a frequency of 1/s) more than doubles, or else the storage modulus G' (DMA, dynamic-mechanical analysis to DIN EN ISO 6721-1:2011 at a frequency of 1/s) falls to a value of less than half the starting value. The decrease in G' is the preferred selection criterion. It has been found that the polymers for use with preference in accordance with the invention show only low gel formation, if any, whenever they unavoidably thermally decompose. In that case, there is a reduced risk of blockage of a discharge nozzle in spite of onset of crosslinking reaction with the isocyanate.

In a further preferred embodiment, prior to the application of the material, it is heated from a temperature of ≤40° C., preferably ≤30° C., to the maximum application temperature within ≤5 minutes (preferably ≤2 minutes, more preferably ≤1 minute).

In a preferred embodiment, the material, after production and prior to use, is stored in predominantly dry form at an air humidity of ≤30% and at temperatures of ≤30° C. and used within ≤1 year, preferably ≤6 months and more preferably ≤3 months. Rather than or in combination with dry storage, the material can be stored in a package impermeable to air humidity. Such packages are known from the foods sector for storage of moisture-sensitive foods.

In a further-preferred embodiment, the crosslinkable material according to the invention is stored with exclusion of light and oxygen after production and prior to use. Such packages are known from the foods sector for storage of light- and oxidation-sensitive foods.

In a further preferred embodiment, the material is heated within the discharge element to the envisaged maximal application temperature such that the viscosity of the material at this temperature experiences a decrease at least by a factor of 10 (preferably at least by a factor of 50, further preferably at least by a factor of 100).

In a further preferred embodiment, the distance between the surface of the substrate and the discharge opening of the discharge element is ≤1 mm. Preference is given to a distance of ≤0.5 mm, more preferably ≤0.1 mm. In a further preferred embodiment of the method according to the invention, the nozzle is contacted directly with the substrate or has a negative distance from the substrate. This embodiment is particularly advantageous when the substrate is flexible and can yield to the nozzle and the pressure of the extruded hotmelt. In this particular embodiment, the discharge pressure of the hotmelt from the nozzle exceeds the compression modulus of the substrate. This embodiment is particularly advantageous in the coating of fabrics, scrims, foams, soft elastic and porous materials since particularly good contact can be generated here.

The discharge element with its discharge opening can be run over the first substrate in contact with the first substrate with a constant pressure. The pressure may be adjusted, for example, via a spring element, a hydraulic element or a pressure transducer. What is advantageous in this method, particularly in combination with any negative distance of the discharge nozzle from the substrate, is that any unevenness or surface roughness on the substrate can be compensated for by the constant pressure mode without having to continuously change the programming of the pressure application.

Alternatively or additionally, the distance of the nozzle from the substrate can be measured continuously by a continuous distance measurement, for example by means of laser measurement, and readjusted continuously.

In a further preferred embodiment, the material is applied to the first substrate at a pressure of ≥0.001 bar, preferably ≥0.1 bar, more preferably ≥0.5 bar.

Preferably, the fusible polymer is a polyurethane at least partly obtainable from the reaction of aromatic and/or aliphatic polyisocyanates with suitable (poly)alcohols and/or (poly)amines or blends thereof. Preferably, at least a proportion of the (poly)alcohols used comprises those from the group consisting of: linear polyester polyols, polyether polyols, polycarbonate polyols, polyacrylate polyols or a combination of at least two of these. In a preferred embodiment, these (poly)alcohols or (poly)amines bear terminal alcohol and/or amine functionalities. In a further preferred embodiment, the (poly)alcohols and/or (poly)amines have a molecular weight of 52 to 10 000 g/mol. Preferably, these (poly)alcohols or (poly)amines as feedstocks have a melting point in the range from 5 to 150° C. Preferred polyisocyanates that can be used at least partly for preparation of the fusible polyurethanes are selected from the group comprising: TDI, MDI, HDI, PDI, H12MDI, IPDI, TODI, XDI, NDI, decane diisocyanate or a combination of at least two of these. Particularly preferred polyisocyanates are HDI, PDI, H12MDI, MDI and TDI.

In a further preferred embodiment, the fusible polymer comprises a polyurethane obtainable from the reaction of a polyisocyanate component and a polyol component, said polyol component comprising a polyester polyol having a no-flow point (ASTM D5985) of ≥25° C.

If appropriate, in the reaction to give the polyurethane, it is also possible to use diols from the molecular weight range of ≥62 to ≤600 g/mol as chain extenders.

The polyisocyanate component may comprise a symmetric polyisocyanate and/or a nonsymmetric polyisocyanate. Examples of symmetric polyisocyanates are 4,4'-MDI and HDI.

In the case of asymmetric polyisocyanates, the steric environment of one NCO group in the molecule is different from the steric environment of a further NCO group. One isocyanate group then reacts more quickly with isocyanate-reactive groups, for example OH groups, while the remaining isocyanate group is less reactive. One consequence of the asymmetric construction of the polyisocyanate is that the polyurethanes formed with these polyisocyanates also have a less linear structure.

Examples of suitable nonsymmetric polyisocyanates are selected from the group consisting of: 2,2,4-trimethylhexamethylene diisocyanate, ethylethylene diisocyanate, nonsymmetric isomers of dicyclohexylmethane diisocyanate ($H_{12}$-MDI), nonsymmetric isomers of 1,4-diisocyanatocyclohexane, nonsymmetric isomers of 1,3-diisocyanatocyclohexane, nonsymmetric isomers of 1,2-diisocyanatocyclohexane, nonsymmetric isomers of 1,3-diisocyanatocyclopentane, nonsymmetric isomers of 1,2-diisocyanatocyclopentane, nonsymmetric isomers of 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(3-isocyanatoprop-1-yl)-1,3,3-trimethylcyclohexane, -isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclohexane, norbornane diisocyanatomethyl, 2,4'-diphenylmethane diisocyanate (MDI), 2,4- and 2,6-tolylene diisocyanate (TDI), derivatives of the diisocyanates listed, especially dimerized or trimerized types, or a combination of at least two of these.

Preference is given to 4,4'-MDI or a mixture comprising IPDI and HDI as polyisocyanate component.

The polyol component includes a polyester polyol having a no-flow point (ASTM D5985) of ≥25° C., preferably ≥35° C., more preferably ≥35° C. to ≤55° C. To determine the no-flow point, a test vessel containing the sample is set in slow rotation (0.1 rpm). A flexibly mounted measurement head dips into the sample and, on attainment of the no-flow point, moves away from its position as a result of the abrupt increase in viscosity; the resulting tilting motion triggers a sensor.

Without being restricted to a theory, it is assumed that polyurethanes based on the above-discussed nonsymmetric polyisocyanates and polyester polyols having the no-flow points specified have such a construction that the groups that originate from the polyisocyanates in the polymer constitute soft segments, and the groups that originate from the polyester polyols in the polymer constitute hard segments.

Examples of polyester polyols which can have such a no-flow point are reaction products of phthalic acid, phthalic anhydride or symmetric $\alpha,\omega$-$C_4$- to $C_{10}$-dicarboxylic acids with one or more $C_2$- to $C_{10}$-diols. They preferably have a number-average molecular weight $M_n$ of ≥400 g/mol to ≤6000 g/mol. Suitable diols are especially monoethylene glycol, butane-1,4-diol, hexane-1,6-diol and neopentyl glycol.

Preferred polyester polyols are specified hereinafter, stating their acid and diol components: adipic acid+monoethylene glycol; adipic acid+monoethylene glycol+1,4-butanediol; adipic acid+1,4-butanediol; adipic acid+1,6-hexanediol+neopentyl glycol; adipic acid+1,6-hexanediol; adipic acid+1,4-butanediol+1,6-hexanediol; phthalic acid (anhydride)+monoethylene glycol+trimethylolpropane; phthalic acid(anhydride)+monoethylene glycol, polycaprolactones. Preferred polyurethanes are obtained from a mixture comprising IPDI and HDI as polyisocyanate component and a polyol component comprising an aforementioned preferred polyester polyol. Particularly preferred for constructing the polyurethanes is the combination of a mixture containing IPDI and HDI as the polyisocyanate component with a polyester polyol formed from adipic acid+butane-1,4-diol+hexane-1,6-diol.

It is further preferable that the polyester polyols have an OH number (DIN 53240) of ≥25 to ≤170 mg KOH/g and/or a viscosity (75° C., DIN 51550) of ≥50 to ≤5000 mPas.

One example is a polyurethane obtainable from the reaction of a polyisocyanate component and a polyol component, where the polyisocyanate component comprises an HDI and IPDI and where the polyol component comprises a polyester polyol which is obtainable from the reaction of a reaction mixture comprising adipic acid and also hexane-1,6-diol and butane-1,4-diol with a molar ratio of these diols of ≥1:4 to ≤4:1 and which has a number-average molecular weight $M_n$ (GPC, against polystyrene standards) of ≥4000 g/mol to ≤6000 g/mol. Such a polyurethane may have a magnitude of the complex viscosity (determined by viscometry measurement in the melt with a plate/plate oscillation viscometer according to ISO 6721-10 at 100° C. and a frequency of 1/s) of ≥2000 Pas to ≤500 000 Pas.

A further example of a suitable polyurethane is:

1. Substantially linear polyester polyurethanes having terminal hydroxyl groups as described in EP 0192946 A1, prepared by reaction of
   a) polyester diols of molecular weight above 600 and optionally
   b) diols from the molecular weight range from 62 to 600 g/mol as chain extenders with
   c) aliphatic diisocyanates,
   observing an equivalents ratio of hydroxyl groups of components a) and b) to isocyanate groups of component c) of 1:0.9 to 1:0.999, where component a) consists to an extent of at least 80% by weight of polyester diols from the molecular weight range of 4000 to 6000 based on (i) adipic acid and (ii) mixtures of 1,4-dihydroxybutane and 1,6-dihydroxyhexane in a molar ratio of the diols of 4:1 to 1:4.

In the polyester polyurethanes mentioned under 1, it is preferable that component a) consists to an extent of 100% of a polyester diol of the molecular weight range from 4000 to 6000, the preparation of which involved using, as diol mixture, a mixture of 1,4-dihydroxybutane and 1,6-dihydroxyhexane in a molar ratio of 7:3 to 1:2.

In the polyester polyurethanes mentioned under 1, it is also preferable that component c) comprises IPDI and also HDI.

In the polyester polyurethanes mentioned under 1, it is also preferable that the preparation thereof involved also using, as component b), alkanediols selected from the group consisting of: 1,2-dihydroxyethane, 1,3-dihydroxypropane, 1,4-dihydroxybutane, 1,5-dihydroxypentane, 1,6-dihydroxyhexane or a combination of at least two of these, in an amount of up to 200 hydroxyl equivalent percent, based on component a).

In a further preferred embodiment of the method of the invention, the fusible polymer, after heating to 20° C. above its melting point and cooling to 20° C. at a cooling rate of 4° C./min, within a temperature interval from 25° C. to 40° C. for ≥1 minute (preferably ≥1 minute to ≤100 minutes, more preferably ≥5 minutes to ≤60 minutes), has a storage modulus G' (determined at the respective temperature with a plate/plate oscillation viscometer according to ISO 6721-10 at a frequency of 1/s) of ≥100 kPa to ≤10 MPa and, after cooling to 20° C. and storage at 20° C. for 120 minutes, has a storage modulus G' (determined at 20° C. with a plate/plate oscillation viscometer according to ISO 6721-10 at a frequency of 1/s) of ≥20 MPa (preferably ≥50 MPa, preferably ≥100 MPa).

In a further preferred embodiment, the material applied is contacted with a second substrate. An adhesive bond can thus be formed. The bonding is preferably effected under pressure until the polymer has cooled down to room temperature. The contacting is preferably effected under a pressure of ≥0.1 bar and ≤100 bar, preferably ≥0.5 bar and ≤20 bar, more preferably ≥1 bar and ≤10 bar.

The two substrates may be the same or different.

Suitable substrates are, for example, paper, paperboard, wood, metal, ceramic, leather, synthetic leather, rubber materials, any plastics, including polyurethane-based plastics and foams thereof, and homo- or copolymers of vinyl chloride. Polyvinyl acetate, polyethylene-vinyl acetate.

In a further preferred embodiment, the second substrate includes a hotmelt adhesive and this is contacted with the material applied. Preferably, this hotmelt adhesive is the same material as already used in the method according to the invention or at least also comprises the fusible polymer used in the method according to the invention. The contacting is preferably effected under a pressure of ≥0.1 bar and ≤100 bar, preferably ≥0.5 bar and ≤20 bar, more preferably ≥1 bar and ≤10 bar. It is alternatively preferable that the temperature of the hotmelt adhesive of the second substrate is ≤10° C., preferably ≤20° C., more preferably ≤30° C., below the melting temperature of this adhesive. It is further preferable that the contacting is effected at a temperature of ≤40° C., preferably ≤30° C.

In a further preferred embodiment, the material is heated to the maximum application temperature within the nozzle, the material is introduced into the nozzle at an input rate and discharged from the nozzle at an output rate, and the output rate is greater than the input rate. The output rate may, for example, be 3 times, 4 times or up to 10 times greater than the input rate. The specific rate ratios depend on the diameter of a filament of the material introduced into the nozzle and on the filament geometry of the material discharged.

In a further preferred embodiment, the at least partly molten material is subjected to a pressure of ≥0.5 MPa within the nozzle. The pressure may also be ≥1 MPa or ≥5 MPa.

In a further preferred embodiment, the nozzle is moved sufficiently close to the substrate that the material pressure in the nozzle rises above the calculated theoretical pressure since the distance of the nozzle from the substrate is less than the average diameter of the nozzle. The pressure may also be ≥1 MPa or ≥2 MPa.

In a further preferred embodiment, the method is a method of producing an article from the material comprising a fusible polymer and the method comprises the steps of:

I) applying a filament of the at least partly molten material to a carrier so as to obtain a layer of the material, corresponding to a first selected cross section of the article;

II) applying a filament of the at least partly molten material to a previously applied layer of the material so as to obtain a further layer of the material, corresponding to a further selected cross section of the article and bonded to the layer applied beforehand;

III) repeating step II) until the article has been formed.

In this embodiment, an article is constructed layer by layer. The process is accordingly a melt layering or fused deposition modeling (FDM) process. If the number of repetitions for the applying is sufficiently low the article to be constructed may also be referred to as a two-dimensional article. Such a two-dimensional article can also be characterized as a coating. For example, for construction thereof, ≥2 to ≤20 repetitions for the application can be conducted.

An electronic model of the article to be formed is advantageously held in a CAD program. The CAD program can then calculate cross sections of the model that become cross sections of the article by application of the filament.

Step I) relates to the construction of the first layer on a carrier. Subsequently, step II), in which further layers are applied to previously applied layers of the material, is executed until the desired end result in the form of the article is obtained. The at least partly molten material (also called construction material in the terminology of 3D printing) bonds to existing layers of the material in order to form a structure in z direction.

In a further preferred embodiment, the substrate is a textile, a foil, a paper, a cardboard, a foam, a mould component, part of a shoe, a circuit board for electronic circuits, an electronics housing part or an electronic component.

The invention further relates to a printable material comprising a fusible polymer, wherein the fusible polymer comprises a polyurethane having free NCO groups.

The invention further provides for the use of a material according to the invention comprising a fusible polymer for production of articles by means of additive manufacturing methods.

The present invention is elucidated in detail by the examples which follow, but without being restricted thereto.

Feedstocks:

Dispercoll® U 54, an anionic, high molecular weight polyurethane dispersion, sourced from Covestro Deutschland AG, was used as obtained. Dispercoll® U 54 is a raw material for production of thermally activatable adhesives.

Technical properties of Dispercoll® U 54:

| Name of the property | Test method | Unit | Value |
| --- | --- | --- | --- |
| pH | DIN ISO 976 | | 6.0-9.0 |
| Viscosity at 20° C. spindle L2/30 rpm | DIN 53019 | mPa * s | 40-600 |
| Nonvolatiles (1 g/1 h/125° C.) | DIN EN ISO 3251 | % | 49-51 |
| Density 20° C. | DIN 51757 | g/cm$^3$ | about 1.1 |
| Minimum film formation temperature | DIN ISO 2115 | ° C. | about 5 |

Bayhydur® BL 2867 was sourced from Covestro Deutschland AG and used as obtained.

Bayhydur® BL 2867 is a reactive blocked aliphatic polyisocyanate having a solids content of 38.0±1.0% (DIN EN ISO 3251) in water and having a viscosity (23° C.) of <1500 mPas (DIN EN ISO 3219/A.3). The blocking agent used was 3,5-dimethylpyrazole. The molar mass (Mn) is about 1600 g/mol.

Baybond® XL 6366 was sourced from Covestro Deutschland AG and used as obtained. Baybond® XL 6366 is a blocked aliphatic water-based polyisocyanate having a solids content of 44-46% (DIN EN ISO 3251) and a flow time (DIN 4 cup) of 10-30 s (AFAM 2008/10503). The blocking agent used was 2-butanone oxime. The molar mass (Mn) is about 2000 g/mol.

Baybond® XL 7270 was sourced from Covestro Deutschland AG and used as obtained. Baybond® XL 7270 is a blocked aliphatic water-based polyisocyanate having a solids content of 29-31% (DIN EN ISO 3251) and a viscosity (23° C.) of <100 mPas (DIN EN ISO 3219/A.3). The blocking agent used was caprolactam. The molar mass (Mn) is about 1850 g/mol.

Test Methods:

The methods detailed hereinafter for determination of the appropriate parameters were employed for conduction and evaluation of the examples and are also the methods for determination of the parameters of relevance in accordance with the invention in general.

Melting point was determined by means of differential scanning calorimetry (DSC) (Q2000, Ta Instruments) at a heating rate of 5° C./min from the 2nd heating.

Glass transition temperature was determined with the aid of dynamic mechanical analysis (DMA) (Q800, from TA Instruments) to DIN EN ISO 6721-1:2011 at a frequency of 1 Hz. For sample preparation, a film having a thickness of about 0.4 mm was pressed from the polymer filament of thickness about 3 mm at 60° C. and a pressure of 100 bar over a period of 60 seconds.

The NCO groups blocked with a blocking agent are determined in the solid fusible polymer by means of gas chromatography (GC) (Agilent 6890 gas chromatograph). For this purpose, the solid fusible polymer was dissolved in acetone at a concentration of 0.5% by weight and then injected at an injector temperature of 290° C. On injection, the blocking agent is released at the temperature of 290° C. within the injector and detected as a signal. The detector used was a flame ionization detector (FID).

Storage modulus G' at 20° C. above the melting point was determined by means of a plate/plate observation viscometer (MCR301, from Anton Paar) to ISO 6721-10 at a frequency of 1 Hz and an amplitude of 1%.

Storage modulus G' at 10° C. below the melting point with prior heating to a temperature of 20° C. above the melting point and subsequent cooling at 1° C./min was determined with a plate/plate observation viscometer (MCR301, from Anton Paar) to ISO 6721-10 at a frequency of 1 Hz and an amplitude of 1%.

Storage modulus G' at the highest application temperature attained during the application process was determined after heating to a given temperature of 60 minutes in a plate/plate oscillation viscometer (ARES, from TA Instruments) to ISO 6721-10 at a frequency of 1 Hz and an amplitude of 1%.

Residual moisture content was determined by thermogravimetry. For this purpose, 1 g of the filament was dried at 125° C. on a drying balance (HG 53, from Mettler Toledo) for 60 minutes and the solids content (%) was ascertained. Residual moisture content (Rf) is determined by calculation as the difference Rf=100%−solids content (%).

INVENTIVE EXAMPLE 1

1000 g of the aqueous polyurethane dispersion Dispercoll® U 54 (50% in water) was mixed with 65.79 g of the blocked polyisocyanate Bayhydur® BL 2867 and stirred with a laboratory stirrer (from Heidolph Instruments GmbH & CO. KG) for 3 min. Subsequently, the mixture was immediately stored at −12° C. for 36 hours and then at 23° C. for 24 h. Subsequently, the coarse-grain mixture present was filtered and the grainy residue was sieved through a 4 mm sieve and dried in an air circulation drying cabinet at 30° C. for 48 h. What was obtained was a white coarse-grain powder having a residual moisture content of <2%. Subsequently, this was processed in a twin-screw extruder (Micro Compounder, from DSM Xplore) at 100° C. with a residence time of <5 min at 40 rpm through an orifice nozzle having a diameter of 3 mm to give a strand having a diameter of about 3 mm. The strand obtained was processed in an FDM printer (X400CE, from German RepRap), modified for the processing of 3 mm strands, with the following process conditions: construction space temperature=23° C., extrusion nozzle diameter=0.8 mm, extruder temperature=260° C., extrusion rate=70 m/s. The volume in the heating region of the nozzle is about 0.2 ml, which results in an average residence time of the molten material during the application process of about 6 seconds.

TABLE 1

Data of the material extruded in the twin-screw extruder

| | |
|---|---|
| Melting point Tm (° C.) | 45.0 |
| Glass transition temperature Tg (° C.) | −40.9 |
| Content of 3,5-dimethylpyrazole [% by wt.] | 1.56 |
| Storage modulus G' 20° C. above Tm (Pa) | 377000 |
| Storage modulus G' 10° C. below Tm (Pa) | 720000 |
| Storage modulus G' at 200° C. (after 60 sec) (Pa) | 757 |
| Storage modulus G' at 200° C. (after 600 sec) (Pa) | 43600 |
| Processible on the FDM printer | yes |

INVENTIVE EXAMPLE 2

1000 g of the aqueous polyurethane dispersion Dispercoll® U 54 (50% in water) was mixed with 55.56 g of the blocked polyisocyanate Baybond® XL 6366 and stirred with a laboratory stirrer (from Heidolph Instruments GmbH & CO. KG) for 3 min. Subsequently, the mixture was immediately stored at −12° C. for 36 hours and then at 23° C. for 24 h. Subsequently, the coarse-grain mixture present was filtered and the grainy residue was sieved through a 4 mm sieve and dried in an air circulation drying cabinet at 30° C. for 48 h. What was obtained was a white coarse-grain powder having a residual moisture content of <2%. Subsequently, this was processed in a twin-screw extruder (Micro Compounder, from DSM Xplore) at 100° C. with a residence time of <5 min at 40 rpm through an orifice nozzle having a diameter of 3 mm to give a strand having a diameter of about 3 mm. The strand obtained was processed in an FDM printer (X400CE, from German RepRap), modified for the processing of 3 mm strands, with the following process conditions: construction space temperature=23° C., extrusion nozzle diameter=0.84 mm, extruder temperature=260° C., extrusion rate=70 m/s. The volume in the heating region of the nozzle is about 0.2 ml, which results in an average residence time of the molten material during the application process of about 6 seconds.

TABLE 2

Data of the material extruded in the twin-screw extruder

| | |
|---|---|
| Melting point Tm (° C.) | 45.2 |
| Glass transition temperature Tg (° C.) | −41.6 |
| Content of 2-butanone oxime [% by wt.] | 1.52 |

TABLE 2-continued

Data of the material extruded in the twin-screw extruder

| | |
|---|---|
| Storage modulus G' 20° C. above Tm (Pa) | 253000 |
| Storage modulus G' 10° C. below Tm (Pa) | 514000 |
| Storage modulus G' at 200° C. (after 60 sec) (Pa) | 556 |
| Storage modulus G' at 200° C. (after 600 sec) (Pa) | 5610 |
| Processible on the FDM printer | yes |

INVENTIVE EXAMPLE 3

1000 g of the aqueous polyurethane dispersion Dispercoll® U 54 (50% in water) was mixed with 83.36 g of the blocked polyisocyanate Baybond® XL 7270 and stirred with a laboratory stirrer (from Heidolph Instruments GmbH & CO. KG) for 3 min. Subsequently, the mixture was immediately stored at −12° C. for 36 hours and then at 23° C. for 24 h. Subsequently, the coarse-grain mixture present was filtered and the grainy residue was sieved through a 4 mm sieve and dried in an air circulation drying cabinet at 30° C. for 48 h. What was obtained was a white coarse-grain powder having a residual moisture content of <2%. Subsequently, this was processed in a twin-screw extruder (Micro Compounder, from DSM Xplore) at 100° C. with a residence time of <5 min at 40 rpm through an orifice nozzle having a diameter of 3 mm to give a strand having a diameter of about 3 mm. The strand obtained was processed in an FDM printer (X400CE, from German RepRap), modified for the processing of 3 mm strands, with the following process conditions: construction space temperature=23° C., extrusion nozzle diameter=0.8 mm, extruder temperature=260° C., extrusion rate=70 m/s. The volume in the heating region of the nozzle is about 0.2 ml, which results in an average residence time of the molten material during the application process of about 6 seconds.

TABLE 3

Data of the material extruded in the twin-screw extruder

| | |
|---|---|
| Melting point Tm (° C.) | 46.0 |
| Glass transition temperature Tg (° C.) | −41.6 |
| Content of ε-caprolactam [% by wt.] | 2.12 |
| Storage modulus G' 20° C. above Tm (Pa) | 301000 |
| Storage modulus G' 10° C. below Tm (Pa) | 568000 |
| Storage modulus G' at 200° C. (after 60 sec) (Pa) | 396 |
| Storage modulus G' at 200° C. (after 600 sec) (Pa) | 21200 |
| Processible on the FDM printer | yes |

NONINVENTIVE EXAMPLE 4

1000 g of the aqueous polyurethane dispersion Dispercoll® U 54 (50% in water) was stored at −12° C. for 36 hours and then at 23° C. for 24 h. Subsequently, the coarse-grain mixture present was filtered and the grainy residue was sieved through a 4 mm sieve and dried in an air circulation drying cabinet at 30° C. for 48 h. What was obtained was a white coarse-grain powder having a residual moisture content of <2%. Subsequently, this was processed in a twin-screw extruder (Micro Compounder, from DSM Xplore) at 100° C. with a residence time of <5 min at 40 rpm through an orifice nozzle having a diameter of 3 mm to give a strand having a diameter of about 3 mm. The strand obtained was processed in an FDM printer (X400CE, from German RepRap), modified for the processing of 3 mm strands, with the following process conditions: construction space temperature=23° C., extrusion nozzle diameter=0.8 mm, extruder temperature=260° C., extrusion rate=70 m/s. The volume in the heating region of the nozzle is about 0.2 ml, which results in an average residence time of the molten material during the application process of about 6 seconds.

TABLE 4

Data of the material extruded in the twin-screw extruder

| | |
|---|---|
| Melting point Tm (° C.) | 44.5 |
| Glass transition temperature Tg (° C.) | −44 |
| Content of blocking agent [% by wt.] | 0 |
| Storage modulus G' 20° C. above Tm (Pa) | 435000 |
| Storage modulus G' 10° C. below Tm (Pa) | 736000 |
| Storage modulus G' at 200° C. (after 60 sec) (Pa) | 781 |
| Storage modulus G' at 200° C. (after 600 sec) (Pa) | 1380 |
| Processible on the FDM printer | yes |

The storage modulus at 20° C. after 600 seconds is less than twice as high as the storage modulus at 200° C. after 60 seconds; the example is not in accordance with the invention.

The invention claimed is:

1. A method of applying a material comprising a fusible polymer, comprising:
applying a filament of an at least partly molten material comprising a fusible polymer from a discharge opening of a discharge element to a first substrate, wherein the at least partly molten material is applied to the first substrate at a pressure of ≥0.001 bar;
wherein
the fusible polymer has the following properties:
a melting point (DSC, differential scanning calorimetry; 2nd heating at heating rate 5° C./min) within a range from ≥35° C. to ≤150° C.;
a glass transition temperature (DMA, dynamic-mechanical analysis to DIN EN ISO 6721-1:2011) within a range from ≥−70° C. to ≤110° C.;
wherein the filament, during the application process, has an application temperature of ≥100° C. above a melting point of the fusible polymer for ≤20 minutes, and
wherein there are furthermore NCO groups blocked with a blocking agent present in the material comprising the fusible polymer.

2. The method according to claim 1, wherein the fusible polymer also has at least one of the following properties:
A1) a storage modulus G' (plate/plate oscillation viscometer to ISO 6721-10 at a frequency of 1/s) at 20° C. above the melting point of ≥1·10⁴ Pa;
A2) a storage modulus G' (plate/plate oscillation viscometer to ISO 6721-10 at a frequency of 1/s) at 10° C. below the melting point with prior heating to a temperature of 20° C. above the melting point and subsequent cooling at a cooling rate of 1° C./min of ≤1·10⁷ Pa;
A3) the storage modulus G' (plate/plate oscillation viscometer to ISO 6721-10 at a frequency of 1/s) of the fusible polymer at the highest application temperature attained during the application process is a factor of ≥10 less than the storage modulus G' (plate/plate oscillation viscometer to ISO 6721-10 at a frequency of 1/s) at a temperature of 20° C. above the melting point of the fusible polymer; or
A4) at least two of properties A1) to A3).

3. The method according to claim 1, wherein the NCO groups in the material comprising the fusible polymer are present in a separate component having an average molecular weight Mn (determined by means of gel permeation chromatography against polystyrene standards and N,N-dimethylacetamide as eluent) of ≥340 g/mol to ≤10 000 g/mol.

4. The method according to claim 1, wherein there are also free groups having Zerewitinoff-active hydrogen atoms present in the material comprising the fusible polymer.

5. The method according to claim 1, wherein the blocking agent is selected such that deblocking of the NCO group is not followed by release of the blocking agent as a free molecule or as a part of other molecules or molecular moieties.

6. The method according to claim 1, wherein the blocking agent comprises acetylacetone, acetoacetic acid, malonic esters, substituted or unsubstituted pyrazoles, alkanone oximes, secondary amines, or a combination of at least two of these.

7. The method according to claim 1, wherein the filament is applied to the first substrate at a rate of ≥20 mm/s.

8. The method according to claim 1, wherein the fusible polymer is selected such that, after storage at the maximum application temperature attained for a duration of ≤1 hour, the storage modulus G' (DMA, dynamic-mechanical analysis to DIN EN ISO 6721-1:2011 at a frequency of 1/s) more than doubles or the storage modulus G' (DMA, dynamic-mechanical analysis to DIN EN ISO 6721-1:2011 at a frequency of 1/s) falls to a value of less than half the starting value.

9. The method according to claim 1, wherein, prior to application of the material, it is heated from a temperature of ≤40° C. to a maximum application temperature within 5 minutes.

10. The method according to claim 1, wherein the discharge element with its discharge orifice is run over the first substrate in contact with the first substrate at a constant pressure.

11. The method according to claim 1, wherein the fusible polymer comprises a polyurethane obtained from a reaction of a polyisocyanate component and a polyol component, where the polyol component includes a polyester polyol having a no-flow point (ASTM D5985) of ≥25° C.

12. The method according to claim 1, wherein the fusible polymer, after heating to 20° C. above its melting point and cooling to 20° C. at a cooling rate of 4° C./min, within a temperature interval from 25° C. to 40° C. for ≥1 minute, has a storage modulus G' (determined at the respective temperature with a plate/plate oscillation viscometer to ISO 6721-10 at a frequency of 1/s) of ≥100 kPa to ≤10 MPa and, after cooling to 20° C. and storage at 20° C. for 120 minutes, has a storage modulus G' (determined at 20° C. with a plate/plate oscillation viscometer to ISO 6721-10 at a frequency of 1/s) of ≥20 MPa.

13. The method according to claim 1, wherein the material applied is contacted with a second substrate.

14. The method according to claim 1, wherein the method comprises a method of producing an article from the material comprising a fusible polymer and the method comprises the steps of:
I) applying a filament of the at least partly molten material to a carrier so as to obtain a layer of the material, corresponding to a first selected cross section of the article;

II) applying a filament of the at least partly molten material to a previously applied layer of the material so as to obtain a further layer of the material, corresponding to a further selected cross section of the article and bonded to the layer applied beforehand; and
III) repeating step II) until the article has been formed.

\* \* \* \* \*